Figure 1:
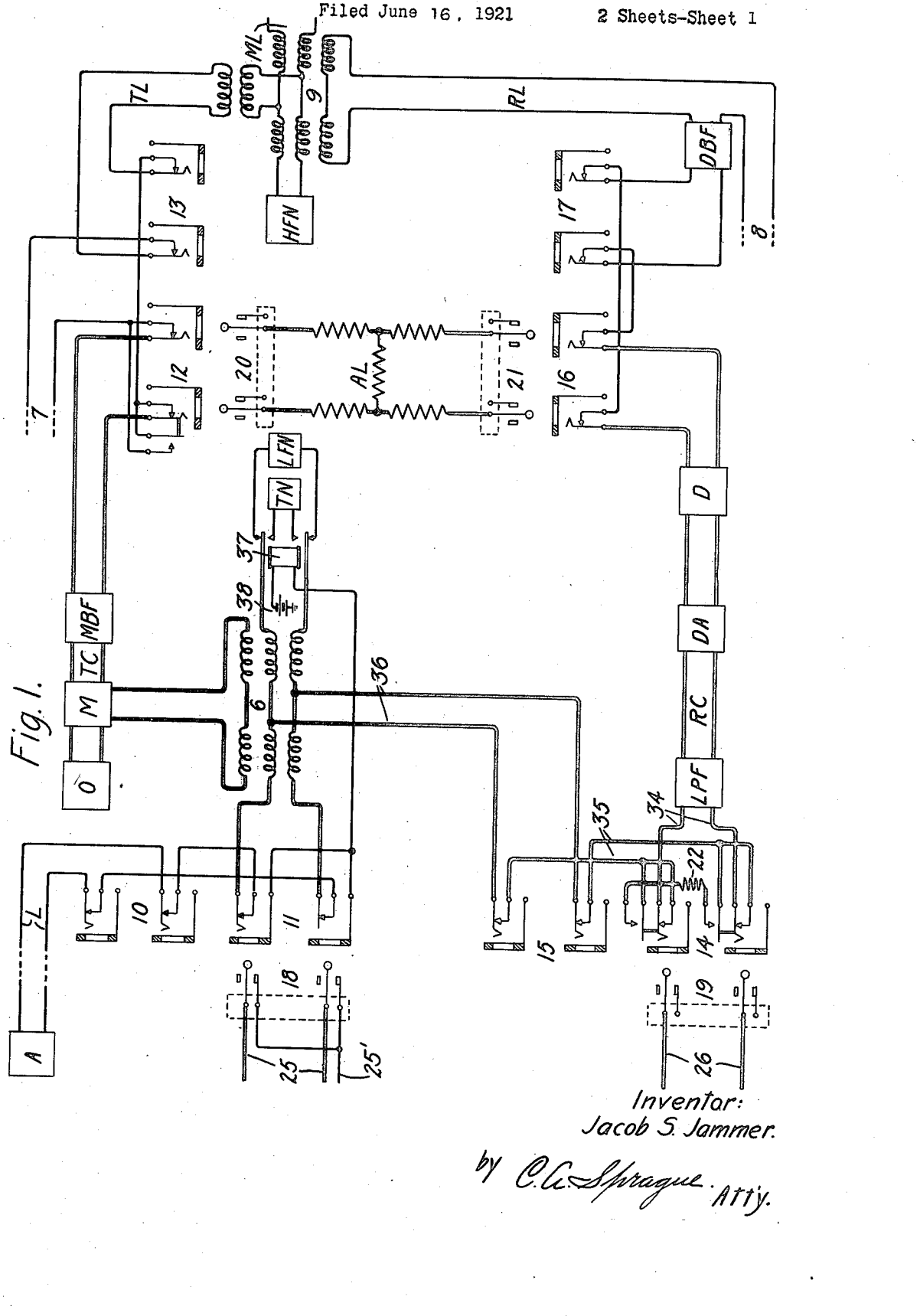

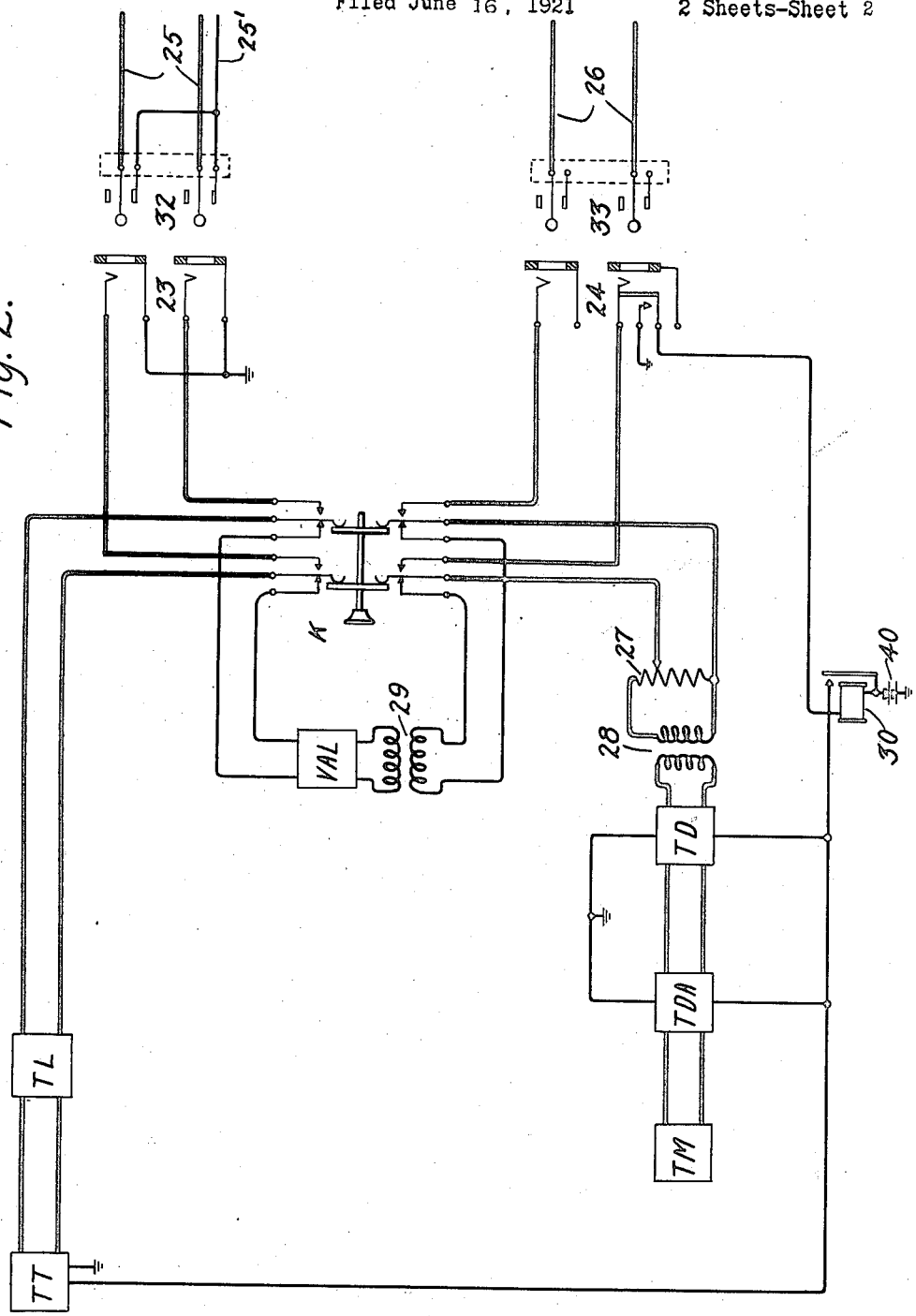

Patented Aug. 21, 1923.

1,465,395

UNITED STATES PATENT OFFICE.

JACOB S. JAMMER, OF NEW YORK, N. Y., ASSIGNOR TO WESTERN ELECTRIC COMPANY, INCORPORATED, OF NEW YORK, N. Y., A CORPORATION OF NEW YORK.

TESTING CIRCUITS FOR CARRIER WAVE-SIGNALING SYSTEMS.

Application filed June 16, 1921. Serial No. 477,920.

*To all whom it may concern:*

Be it known that I, JACOB S. JAMMER, a citizen of the United States of America, residing at New York, in the county of New York, State of New York, have invented certain new and useful Improvements in Testing Circuits for Carrier Wave-Signaling Systems, of which the following is a full, clear, concise, and exact description.

This invention relates to testing circuits for carrier wave signaling systems, and more particularly to means for testing the transmission efficiency of the terminal apparatus of such carrier wave systems.

In carrier wave signaling systems as commonly arranged, a signaling frequency circuit is connected to a common transmission line by means of a two-way channel comprising a transmitting circuit and a receiving circuit. A carrier wave supplied to the transmitting circuit is modulated in accordance with signaling current incoming over the signaling frequency circuit and modulated energy is sent out over the common line for transmission in one direction. For transmission in the opposite direction modulated energy, supplied by a cooperating distant station, incoming from the common line is detected or demodulated in the receiving circuit, and current corresponding to the distant signaling current is sent out over the signaling frequency circuit.

In order to ascertain that the apparatus is functioning properly, it is necessary frequently to test the transmitting and receiving circuits. To do this quickly a so-called "loop-gain" test is employed. This test is made by disconnecting the common line with its balanced or conjugate transformer from both the transmitting circuit and receiving circuit of the carrier channel, and substituting an artificial line therefor. The transmitting branch of the testing circuit is substituted for the signaling frequency circuit, while the receiving circuit of the channel to be tested is disconnected from the bridge terminals of the conjugate transformer and connected to the receiving branch of the testing circuit. In order to obtain accurate results from the test, the circuit, connected as described above, must simulate actual service conditions.

The general method of making the "loop-gain" test is the invention of another, and is disclosed in a patent to J. Davidson, Jr., No. 1,445,759, dated Feb. 20, 1923.

The object of this invention is to provide an improvement in the circuit arrangement for making this test. One feature of the invention is the provision of means for accurately simulating service conditions. Another feature is the provision of means for automatically connecting the necessary simulating means when the circuit is set up for testing. Still another feature is the provision of an impedance connected across the bridge terminals of the balanced transformer as the simulating means.

In one embodiment of the invention a signaling frequency circuit is connected to the transmitting and receiving circuits of a carrier channel by means of a conjugate transformer. The transmitting circuit is connected to the series winding of the transformer, while the receiving circuit is connected to the bridge terminals of the same transformer. The transmitting branch of the test circuit is adapted to be substituted for the signaling frequency circuit through the intermediary of a jack. The receiving branch of the test set is adapted to be connected to the receiving circuit of the channel by means of a jack connected into the bridge circuit.

By this invention an impedance corresponding to the normal impedance of the bridge circuit is automatically connected across the bridge terminals of the transformer when the test receiving branch is connected to the receiving circuit of the channel.

The invention is not to be limited to the one embodiment herein described, but is applicable to other circuits wherein two-way transmission of signals may be accomplished. A two-way telephone repeater may be cited merely as one example.

The invention will now be described in detail in connection with the one embodiment illustrated in the drawing. Fig. 1 shows a carrier wave signaling system arranged in accordance with this invention, while Fig. 2 shows a testing circuit adapted to cooperate therewith.

In Fig. 1 a low frequency telephone line L, which constitutes a signaling frequency circuit, is connected to a common line ML by means of a two-way carrier channel comprising a transmitting circuit TC and a receiving circuit RC. At the other end of line L is a low frequency telephone station A. This station may be an ordinary subscriber's station, but more commonly it will be a telephone exchange. The transmitting circuit TC comprises a source of carrier waves such as an oscillator O, a modulator M, and a modulator band filter MBF. The receiving circuit RC comprises a detector band filter DBF, a detector D, a detector amplifier DA, and a low pass filter LPF.

Band filters MBF and DBF are of the general type described in Patents No. 1,227,113 and No. 1,227,114 to G. A. Campbell, dated May 22, 1917. These filters are adapted to pass with negligible attentuation a broad band of frequencies in the neighborhood of the carrier frequency assigned to the circuit wherein the filter is used and of a width equal to the range of frequencies essential to voice transmission. The low pass filter LPF is also of the general type described in the Campbell patents referred to above. It is adapted to suppress currents having frequencies above the highest essential frequency of voice currents and to transmit with substantially negligible attentuation currents of the highest essential voice frequency and of all lower frequencies.

The oscillator O, modulator M, detector D, and detector amplifier DA may be of any suitable design, but preferably thermionic vacuum discharge devices will be used.

The transmitting circuit TC and receiving circuit RC are conjugately connected to the low frequency line L through the balanced or conjugate transformer 6. The balancing network LFN is normally connected to the balanced transformer 6 to balance the low frequency line L. Another balancing network TN is adapted to be connected thereto, when a test circuit is substituted for the low frequency line L, in a manner hereinafter to be described.

Between the transmitting circuit TC and the common line ML is a transmitting circuit TL common to all of the channels of the multiplex system, and between the receiving circuit RC and the common line ML is a receiving circuit RL likewise common to all of the channels. In addition to the circuits TC and RC connected respectively to circuits TL and RL, transmitting and receiving circuits for other channels may be connected thereto as indicated at 7 and 8 respectively. In this way a plurality of two-way channels may be connected to the common line ML. In order to connect the common transmitting circuit TL and the common receiving circuit RL conjugately to the common line ML, a balanced or conjugate transformer 9 is provided and a balancing network HFN to balance the common line ML is connected to transformer 9.

In order to provide for testing, pairs of jacks 10 and 11 are inserted in the low frequency circuit L; pairs of jacks 12 and 13, in the common transmitting circuit TL; pairs of jacks 14 and 15 in the receiving circuit RC between the balanced transformer 6 and the low pass filter LPF, and pairs of jacks 16 and 17, in the receiving circuit between the detector D and the detector band filter DBF.

Jacks 10 and 11 are so arranged that normally a continuous circuit is provided between line L and balanced transformer 6. However, if twin plugs such as 18 are inserted in either of jacks 10 or 11, a circuit terminating in the twin plugs 18 will be connected to the line L in the first instance, or the balanced transformer 6 in the second.

Jacks 12 and 13 are so arranged that normally a continuous circuit is completed between the common transmission circuit TL and the modulator band filter MBF. If a twin plug such as 20, however, is inserted in jacks 12, a circuit is completed between twin plug 20 and the transmitting circuit TC, while a connection between the common transmitting circuit TL and the channels as indicated at 7 is completed to take the place of the end section of modulator band filter MBF.

Twin plug 21 is adapted for insertion in jacks 16 whereby connection is made between twin plugs 21 and the receiving circuit RC.

Twin plug 19 is adapted to cooperate with jacks 14 to complete a circuit between twin plug 19 and the receiving circuit RC. When so cooperating, receiving circuit RC is disconnected from the balanced transformer 6, and an impedance element 22, associated with the jack 14, is automatically connected across the bridge terminals of the balanced transformer 6, the circuit of which extends through the normally closed contacts of jacks 15.

If a plug is inserted in jacks 15 for any purpose, such as for patching a different low frequency line, than the one normally connected to this channel, the impedance element 22 is disconnected from the conductors 36.

For test purposes an artificial line AL is provided which terminates at opposite ends in twin plugs 20 and 21 respectively.

Referring now to Fig. 2 which illustrates a testing circuit adapted to cooperate with the carrier channel of Fig. 1, a source of testing current TT may be connected to a pair of jacks 23 through an artificial line TL by the actuation of a testing key K. A pair of receiving jacks 24 are adapted by the actuation of key K to be connected to a test meter TM through potentiometer 27, transformer 28, test detector TD and test detector amplifier TDA. A variable artificial line VAL and transformer 29 are normally connected through key K between the artificial line TL and the potentiometer 27. For purposes of comparison, while making a test, the key K is adapted to substitute jacks 23 and 24 for the variable artifical line VAL and transformer 29. Relay 30 is provided to automatically control the source of testing current TT, the test detector TD and the test detector amplifier TDA when twin plugs 33 are inserted in jacks 24. In order to provide means for connecting the testing circuit of Fig. 2 to the carrier channel of Fig. 1, patching cords are provided which comprise conductors 25 connecting twin plugs 18 and 32 and conductors 26 connecting twin plugs 19 and 33.

In the testing circuit of Fig. 2, the source of testing current TT, the test detector TD and the test detector amplifier TDA may be of any convenient design, but preferably they are thermionic vacuum discharge devices of well known design.

The operation of the two-way channel of Fig. 1 for the transmission of signals is briefly as follows:

A signaling current such as that furnished by a microphone at the originating station A, passes over line L through the normally closed contacts of jacks 10 and 11 to the balanced trasformer 6, thence by the inductive coupling between the windings of transformer 6 to the modulator M. Carrier current supplied by the oscillator O is modulated by the signaling current in the modulator M, and modulated energy is transmitted through the band filter MBF, the normally closed contacts of jacks 12 and 13 and the balanced transformer 9, to the common line ML. This energy is received at a distant cooperating receiving station (not shown) in a manner which will now be described in connection with the receiving circuit of the carrier channel of Fig. 1.

Modulated energy incoming from the common line ML is transmitted inductively by the balanced transformer 9 to the common receiving circuit RL thence through detector band filter DBF and normally closed contacts of jacks 17 and 16 to the detector D. By the well-known operation of this device, current of original wave form is obtained, which is transmitted through the detector amplifier DA, the low pass filter LPF, normally closed contacts of jacks 14 and 15, through the balanced transformer 6, normally closed contacts of jacks 11 and 10, and over the line L to station A.

Ordinarily, each transmitting channel with its cooperating receiving channel employs a carrier wave of distinctive frequency. The carrier waves used for transmission and reception by a given channel are therefore not the same. The constants of the modulator band filter MBF and the detector band filter DBF are consequently different and these filters are accordingly adapted to pass different ranges of frequencies.

The method of testing the transmission efficiency of the system of Fig. 1 by means of the testing circuit of Fig. 2 will now be described.

The artificial line AL is substituted for the common line ML and the balanced transformer 9 by the insertion of twin plugs 20 in jacks 12 and twin plugs 21 in jacks 16. The transmitting branch of the testing circuit of Fig. 2 is connected to the carrier channel by patching jacks 23 and 11 together by means of conductors 25. To do this twin plugs 18 are inserted into jacks 11 and twin plugs 32, into jacks 23. The receiving branch of the testing circuit of Fig. 2 is connected to the receiving circuit of the carrier channel of Fig. 1 by patching jacks 24 and 14 together by means of conductors 26. This is accomplished by the insertion of twin plugs 33 into jacks 24, and the insertion of twin plugs 19 into jacks 14.

The insertion of twin plugs 19 into jacks 14 connects the conductors 26 to the conductors 34. This operation also disconnects conductors 35 from conductors 34 at the normally closed contacts of jacks 14 and at the same time connects the impedance element 22 across the conductors 35 at the normally open contacts of jacks 14 (now closed). Conductors 35 are connected to the bridge terminals 36 of the balanced transformer 6 through the normally closed contacts of jacks 15. Impedance element 22 is substantially equivalent to the impedance of the receiving circuit RC viewed from the left hand terminals of the low pass filter LPF. By the switching arrangement just described, it is seen that when the receiving circuit RC is disconnected from the balanced transformer 6 at the left hand terminals of the low pass filter LPF, a substantially equivalent or simulating impedance is automatically connected in its place.

The patching of jacks 23 to jacks 11 by conductors 25' causes the operation of relay 37. An energizing circuit for relay 37 may be traced from the ground side of battery 38, through battery 38, the winding of relay 37, the sleeve connections of jacks 11 and twin plugs 18, the sleeve conductor 25' through the sleeve connections of twin plugs 32 and jacks 23 to ground. The operation of relay 37 disconnects the low frequency balancing network LFN from the balanced transformer 6 and substitutes therefor a test balancing network TN by means of the normally open contacts (now closed) of relay 37. This substitution is necessary in order to preserve the balance of transformer 6, when the low frequency line L is disconnected from the transformer 6 at jacks 11 and the test circuit is substituted therefor.

When twin plugs 33 are inserted in jacks 24, relay 30 is energized through a circuit from ground, through battery 40, the winding of relay 30, the normally open contact of lower jack 24 (now closed) to ground. The energization of relay 30 connects the battery 40 through the normally open contact of relay 30 (now closed), the source of testing current TT, test detector TD, and test detector amplifier TDA to ground. Battery 40 is therefore adapted to supply energy to these devices.

When the test circuit of Fig. 2 has been connected to the carrier channel of Fig. 1 in the manner above described and the key K has been actuated, test current from the source TT flows through the artificial line TL, the normally open upper contacts of key K (now closed), jacks 23 and twin plugs 32, conductors 25, twin plugs 18 and jacks 11, and balanced transformer 6 to the modulator M. By means of the modulator M, carrier current from the oscillator O is modulated by the test current. Modulated energy is transmitted through the modulator band filter MBF, jacks 12 and twin plugs 20, the artificial line AL, twin plugs 21 and jacks 16 to the detector D. By the well-known operation of the detector D current of wave form the same as that of the testing current is obtained and is transmitted through detector amplfier DA, low pass filter LPF, jacks 14, twin plugs 19, conductors 26, twin plug 33, jacks 24, the normally open lower contacts (now closed) of key K, the potentiometer 27, transformer 28 to the test detector TD, where the alternating current is rectified, and, after amplification by the test detector amplifier TDA, operates the test meter TM. Potentiometer 27 is so adjusted as to give a suitable deflection, such, for example, as a mid-scale reading, in the test meter TM. The key K is now returned to its normal position and the variable artificial line VAL adjusted until the meter gives the same deflection. It will be noted that the key K substitutes the artificial line VAL and the transformer 29 for the carrier channel, the circuit of which has just been traced between jacks 23 and 24. The difference in the value of the artificial lines AL and VAL indicates the gain or loss in the carrier loop depending upon whether the value of the variable artificial line VAL is less or greater respectively than the value of the artificial line AL.

This circuit arrangement gives an accurate measure of the loop-gain or transmission efficiency of the combined transmitting and receiving circuits since actual service conditions are simulated during the test. In an actual circuit of this kind set up and used the artificial line AL was made the equivalent of 35 miles of standard No. 19 gauge cable. The artificial line TL was made substantially equal to the normally connected low frequency line L, and the energy supplied by the source of test current TT was substantially equal to that supplied by a standard telephone transmitter. The value of the impedance element 22 was substantially 300 ohms, which corresponded to the impedance of the receiving circuit RC viewed from the left hand terminals of the low pass filter LPF. It was found that the the error introduced in this particular circuit by the omission of the impedance element 22 was approximately 10%. The correction of such an error is of substantial importance in long distance telephony, and therefore this invention is of special value in the telephone field.

In applying this invention it is of course clear that it is not necessary to use the transmitting circuit and the receiving circuit of any one channel for a given test. For example the transmitting circuit of one channel and the receiving circuit of another channel may be connected together for testing purposes, but in any case actual service conditions are substantially simulated. Furthermore when transmissions in both directions employ the same frequency range, then both the transmitting and receiving band filters can be included in the test circuit.

This invention is to be understood as limited only by the scope of the appended claims.

What is claimed is:

1. In a two-way signaling system, a transmitting circuit, a receiving circuit, means normally interconnecting said circuits in conjugate relationship, testing means adapted to disconnect said circuits from each other by way of said normal interconnecting means and to interconnect them through said testing means, a plurality of terminals at which said disconnection is effected, and means connected to each of said terminals to simulate the impedance normally connected to each.

2. In a carrier wave signaling system, a transmitting circuit, a receiving circuit, a conjugate connecting means to associate said circuits with each other, an impedance element substantially equal in impedance to the impedance of said receiving circuit as connected to said conjugate connecting means and means to disconnect said receiving circuit from said connecting means and to connect said impedance element to said conjugate connecting means.

3. In a carrier wave signaling system, a terminal station comprising a transmitting circuit, a receiving circuit and a low frequency balanced transformer for conjugately connecting said circuits, means for testing said station the association of which with said station disconnects said receiving circuit from said transformer, and an impedance element connected to said transformer in place of said receiving circuit to balance said transformer during the operation of said testing means.

4. A two-way transmission system comprising a plurality of lines, a plurality of circuits, a plurality of means for conjugately connecting said circuits and lines, means for disconnecting said circuits from one of said connecting means and interconnecting said circuits, means for disconnecting one line and one of said circuits from the other connecting means and connecting a test circuit to said last mentioned connecting means and circuits, an impedance associated with said interconnecting means simulating the impedance of the disconnected portion of the system and an impedance connected to said connecting means simulating the impedance of said disconnected circuit.

5. A two-way transmission system comprising a plurality of lines, a plurality of circuits, means for conjugately connecting said circuits and lines, means for disconnecting one line and one of said circuits from said connecting means and connecting a test circuit to said connecting means and said disconnected circuit and an impedance connected to said connecting means simulating the impedance of said disconnected circuit.

6. The method testing the "loop-gain" of two-way carrier signaling systems having a plurality of lines, a plurality of circuits and means to interconnect said lines and circuits, which method comprises simulating all normal service connections during testing.

7. The method of testing the "loop-gain" of two-way carrier signaling systems having a plurality of lines, a plurality of circuits and means to interconnect said lines and circuits, which method comprises simulating all normal service impedance conditions during testing.

8. In a carrier current signaling system comprising a low frequency signaling circuit associated with a carrier transmission circuit through the transmitting and receiving circuits of a carrier channel for transmitting in opposite directions, the method of testing the transmission efficiency of a carrier channel which consists in disconnecting the transmitting and receiving circuits of the carrier channel from the carrier transmission circuit, looping the disconnected ends of said transmitting and receiving circuits together so that transmission can take place from one to the other, disconnecting the receiving circuit from the low frequency signaling circuit, simulating the impedance of the disconnected receiving circuit with respect to the low frequency circuit and the transmitting circuit, applying signaling current to the transmitting circuit and observing the effect of the resultant received current in the receiving circuit.

In witness whereof, I hereunto subscribe my name this 9th day of June, A. D., 1921.

JACOB S. JAMMER.